C. E. WAKE.
ADJUSTABLE PISTON RING CLAMP.
APPLICATION FILED JULY 10, 1911.

1,017,828.

Patented Feb. 20, 1912.

Witnesses

Charles E. Wake Inventor by C. A. Snow & Co.
Attorneys

COLUMBIA PLANOGRAPH CO., WASHINGTON, D. C.

UNITED STATES PATENT OFFICE.

CHARLES E. WAKE, OF WALLA WALLA, WASHINGTON, ASSIGNOR OF ONE-HALF TO CLARENCE A. ANDREW, OF WALLA WALLA, WASHINGTON.

ADJUSTABLE PISTON-RING CLAMP.

1,017,828.  Specification of Letters Patent.  Patented Feb. 20, 1912.

Application filed July 10, 1911. Serial No. 637,725.

*To all whom it may concern:*

Be it known that I, CHARLES E. WAKE, a citizen of the United States, residing at Walla Walla, in the county of Walla Walla and State of Washington, have invented a new and useful Adjustable Piston-Ring Clamp, of which the following is a specification.

This invention relates to improvements in adjustable piston ring clamps, and the primary object of the invention is the provision of a clamp device adapted for holding piston rings upon the piston head during the insertion of the piston head within a cylinder, the said clamp being so mounted upon the piston head as to retain the rings within the grooves of the piston head and yet be so fitted thereon as to be moved downwardly upon the piston head as the said piston head and rings is inserted within the cylinder, the said clamping device being so constructed as to surround and retain all of the rings within the piston head and having integral and outwardly projecting means adapted to be engaged by the lower edge of the cylinder as the piston head is placed therein.

A further object of this invention is the provision of an adjustable clamping band provided with a series of integral projections upon its upper end and with means for securing said band upon a piston head about the piston rings thereof so as to retain the rings within the grooves of the piston head and yet permit the engagement of the cylinder with said clamping device to remove the same so as to permit the insertion of the piston head and its rings within the cylinder.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
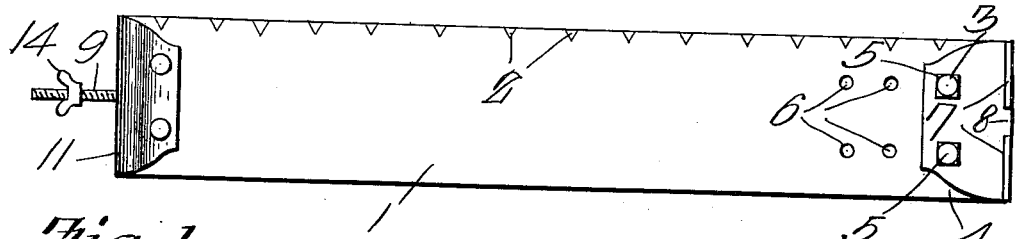
Figure 4:
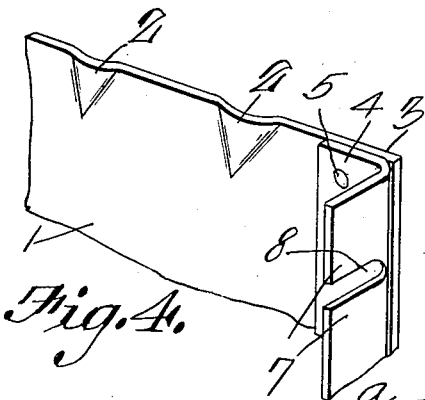
Figure 2:
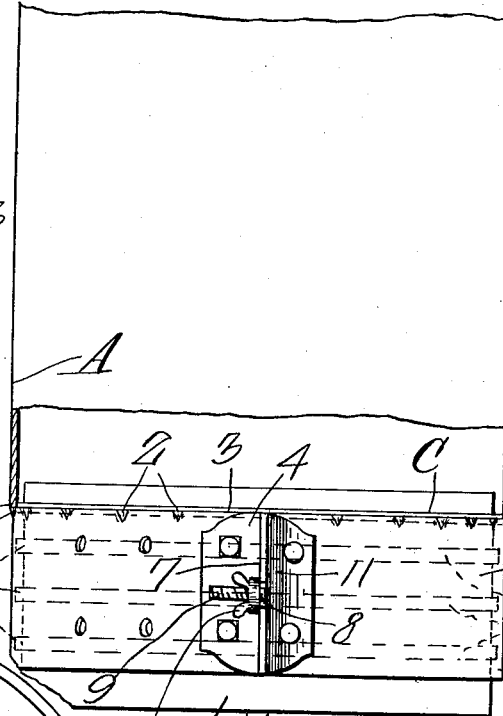
Figure 3:
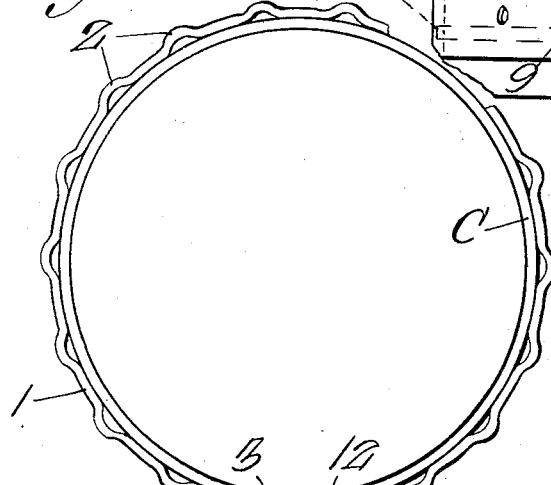
Figure 5:
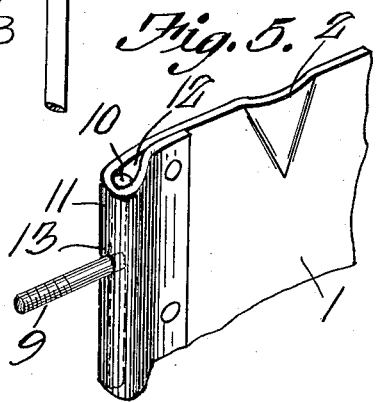

In the drawings—Figure 1 is a plan view of the complete device in extended position. Fig. 2 is a sectional view of the lower portion of a cylinder and a piston head with the clamping device in operable relation thereto, the piston head being in the position it assumes when being inserted within the cylinder. Fig. 3 is a top plan view of a piston head with the clamping device in ring clamping position thereon. Fig. 4 is a perspective view of one terminal of the clamping band on an enlarged scale. Fig. 5 is a similar view of the other terminal thereof.

Referring to the drawings, A designates the cylinder of an explosive engine, B the piston or piston head thereof and C the series of piston rings which are usually carried by the said head in the grooves thereof. As these rings are split rings, when they are placed upon the piston head they have a natural tendency to project beyond the outer circumference thereof and therefore it is very difficult at times to insert the piston head and the rings within the cylinder, and therefore in order to retain the said piston rings so that their outer faces will be within the circumferential line of the piston head, so that the said piston head with rings may be readily inserted within the cylinder A, the clamping band 1 is provided and is of such a width as when assembled and surrounding the piston head to extend above and below the respective rings C of the piston as clearly shown in Fig. 2. This clamping band as clearly shown in Fig. 1 is substantially the same width throughout its length and is made of any desirable material, such for instance as a flat band of flexible metal or any other material that will answer the purpose and is provided upon its upper edge with a series of outwardly projecting cupped portions 2 which when the band is secured in place upon the piston head will form a projecting means to engage the lower edge *a* of the cylinder A as the said piston head is placed within the cylinder, the same being moved toward the cylinder or the cylinder moved toward it as desired.

In order to retain the clamping band circumferentially upon the piston head as shown in Figs. 2 and 3, one terminal as at 3 Fig. 4 is provided with a plate 4, which is held adjustably in place by means of the screws 5, said band being provided with a series of apertures 6 arranged in pairs, to accommodate the band to various diametered piston heads. By this means it will be seen that the said plate 4 may be moved and be secured at the various adjustments upon the ends of the band by means of the bolts or screws 5 and thus render this band adjustable to many diameters of pistons, the said plate 4 being provided with the right angled lug or flange 7 provided with the centrally disposed outwardly opening recess or slot 8 for the removable reception of the threaded rod 9, provided with a T-shaped head 10 disposed within the connecting plate 11 and having the cylindrical receptacle 12 for the reception of the cross head 10 of the threaded bolt 9, the said connecting plate being further provided with an aperture 13 through which the said threaded stud or bolt 19 passes.

Mounted upon the threaded portion 9 of the bolt or rod is a thumb or wing screw 14, by means of which the said screw may be seated within the slot or recess 8 of the plate 4 and cause the clamping band 1 to be retained in the desired adjustment upon the exterior of the piston head around the rings C so as to retain the said rings well within their recesses of the piston head so that their peripheral edges will not project beyond the outer circumference of the cylinder A.

When in use, it will be seen that the band 1 is adjusted so as to permit the two terminals to thoroughly span and surround the piston head at the packing rings portion thereof, and that by means of the manipulation of the threaded clamping device and the plate, that the free ends of the said band are brought closer together as shown in Fig. 2 and the said band will draw the packing rings within the grooves of the piston head, so that the same will assume the position as shown in Figs. 2 and 3, and when the cylinder is placed upon the piston or the piston placed within the cylinder, that the projections 2 of the band will engage the lower rim $a$ of the cylinder A and as the piston head moves within the cylinder, the said band 1 by means of its engagement at $a$, will permit the piston to slide within the cylinder A, the packing rings of the piston not being released from the band until they have entered the bore of the cylinder A and are prevented from offering any obstruction to the free admission of the piston head to the cylinder. It will thus be seen that the piston head may be moved within the cylinder or the cylinder may be moved over the piston head and that the rings are released successively, the band being of sufficient width to cover and retain all of the rings within the grooves and the circumference of the piston. By this means it will be seen that the ready insertion of a piston head with its rings within the cylinder is taken care of and that by simply placing the clamping band as indicated in Fig. 2, that the said band will at all times hold the packing rings within the piston head so that the piston head may be inserted within the cylinder and the packing rings prevented from projecting so as to interfere with the insertion of said piston head within the cylinder.

What is claimed is:

1. A device of this character, comprising a flat strip of material provided with a series of semi-cup shaped projections formed at one edge thereof and provided with a plurality of double rows of apertures through one end thereof, a slotted plate adapted to be connected to one pair of said apertures at a time, the other end of said strip being curved upon itself and secured to form a transverse socket, a screw having a T-shaped head fitting in said socket thus formed, the screw shank thereof being positioned to enter the slot of the slotted plate, and a winged nut mounted upon the screw for securing said folded end to the slotted plate and the respective ends of the strip together.

2. A device of this character, comprising a strip of material provided with parallel edges, one of said edges being provided with a plurality of equi-distantly disposed projecting semi-cup shaped portions stamped from the material and producing a series of projections along said edge, said strip being further provided with a plurality of pairs of alined apertures through one end thereof, and the other end of said strip being folded upon itself and secured to produce a tubular transverse receptacle with a central aperture in the face thereof, a screw having a T-shaped head mounted in said tubular receptacle, the threaded shank thereof being projected through the aperture thereof, a slotted plate adapted to be adjustably connected to any pair of the apertures at the other end of the strip to receive the threaded shank of the screw, and a winged nut upon the threaded shank to lock the ends of the strip relatively to each other.

In testimony that I claim the foregoing as my own, I have hereto affixed my signature in the presence of two witnesses.

CHARLES E. WAKE.

Witnesses:
JOHN C. HURSPOOL,
JAMES I. SIDERINGTON.